(12) United States Patent
Nernberger et al.

(10) Patent No.: US 9,801,499 B2
(45) Date of Patent: *Oct. 31, 2017

(54) CONTAINER AND BLADE ARRANGEMENT FOR FOOD PREPARATION APPLIANCE

(71) Applicant: Spectrum Brands, Inc., Middleton, WI (US)

(72) Inventors: Kroy Everett Nernberger, Madison, WI (US); Jacob Daniel Smith, Madison, WI (US); David W. Everett, Verona, WI (US)

(73) Assignee: Spectrum Brands, Inc., Middleton, WI (US)

( * ) Notice: Subject to any disclaimer, the term of this patent is extended or adjusted under 35 U.S.C. 154(b) by 654 days.

This patent is subject to a terminal disclaimer.

(21) Appl. No.: 14/210,992

(22) Filed: Mar. 14, 2014

(65) Prior Publication Data

US 2014/0263784 A1 Sep. 18, 2014

Related U.S. Application Data

(60) Provisional application No. 61/782,879, filed on Mar. 14, 2013.

(51) Int. Cl.
*A47J 43/046* (2006.01)
*A47J 43/07* (2006.01)
(Continued)

(52) U.S. Cl.
CPC ......... *A47J 43/046* (2013.01); *A47J 43/0722* (2013.01); *A47J 43/0727* (2013.01);
(Continued)

(58) Field of Classification Search
CPC .. A47J 43/046; A47J 43/0727; A47J 43/0722; B02C 18/12
See application file for complete search history.

(56) References Cited

U.S. PATENT DOCUMENTS

| D104,289 S | 4/1937 | Osius |
|---|---|---|
| 2,788,038 A | 4/1957 | Corcoran |

(Continued)

FOREIGN PATENT DOCUMENTS

| BE | 534815 | 1/1955 |
|---|---|---|
| CH | 248170 | 4/1947 |

(Continued)

OTHER PUBLICATIONS

Extended European Search Report for 14159704.7, dated Sep. 9, 2014, 7 pages.

(Continued)

*Primary Examiner* — Mark Rosenbaum
(74) *Attorney, Agent, or Firm* — Kagan Binder, PLLC

(57) ABSTRACT

A food preparation appliance has a base, a blade member rotatable in a direction of rotation, and a container with a closed bottom, an open top and a tubular sidewall together defining an interior space of the container. The top of the container is configured for releasable connection with the base, with the blade member disposed within the interior space of the container. The sidewall has a rib projecting inward of the interior space of the container and extending lengthwise along at least a portion of the sidewall from the top of the container toward the bottom of the container. The rib has, in the direction of rotation of the blade member, a peak defined as the shortest transverse dimension measured from the center of the container to the sidewall at a respective height along the portion of the sidewall having the rib, the rib being asymmetric in transverse cross-section.

6 Claims, 17 Drawing Sheets

(51) Int. Cl.
*B02C 18/12* (2006.01)
*B01F 7/00* (2006.01)
*B01F 7/16* (2006.01)
*B01F 15/00* (2006.01)

(52) U.S. Cl.
CPC ........ *B01F 7/0015* (2013.01); *B01F 7/00275* (2013.01); *B01F 7/00616* (2013.01); *B01F 7/162* (2013.01); *B01F 15/00876* (2013.01); *B02C 18/12* (2013.01)

(56) References Cited

U.S. PATENT DOCUMENTS

| | | |
|---|---|---|
| 2,954,174 A | 9/1960 | Polleys |
| 3,216,473 A | 11/1965 | Dewenter |
| 3,240,246 A | 3/1966 | Dewenter |
| 3,843,521 A | 10/1974 | Zeff |
| D234,741 S | 4/1975 | Emmons |
| D429,956 S | 8/2000 | Bohannon, Jr. et al. |
| D435,192 S | 12/2000 | Bohannon, Jr. et al. |
| 6,974,099 B2 | 12/2005 | Kolar et al. |
| 7,350,963 B2 | 4/2008 | Williams et al. |
| 7,712,951 B2 | 5/2010 | Bohannon et al. |
| 7,918,601 B2 | 4/2011 | Branson, III et al. |
| 8,109,668 B2 | 2/2012 | Garman et al. |
| 2005/0122837 A1 | 6/2005 | Bravard |
| 2008/0198691 A1 | 8/2008 | Behar et al. |
| 2008/0298172 A1 | 12/2008 | Krasznai |
| 2009/0114616 A1 | 5/2009 | White et al. |
| 2011/0032792 A1 | 2/2011 | Liang et al. |
| 2012/0080549 A1 | 4/2012 | Rukavina |

FOREIGN PATENT DOCUMENTS

| | | |
|---|---|---|
| CN | 201279085 | 7/2009 |
| EP | 1940271 A4 | 6/2009 |
| EP | 2522262 A1 | 11/2012 |
| WO | 2004103538 A3 | 12/2004 |
| WO | 2006084055 A2 | 8/2006 |
| WO | 2009127143 A1 | 10/2009 |
| WO | 2012044306 A1 | 4/2012 |
| WO | 2012107794 A1 | 8/2012 |

OTHER PUBLICATIONS

Partial European Search Report for co-pending application EP 17150956.6, 11 pages, dated Jun. 16, 2017.

CONTAINER AND BLADE ARRANGEMENT FOR FOOD PREPARATION APPLIANCE

CROSS-REFERENCE TO RELATED APPLICATION

This application claims priority to U.S. Provisional Patent Application Ser. No. 61/782,879, filed on Mar. 14, 2013, which is incorporated in its entirety by reference.

FIELD

The field of the disclosure relates generally to food preparation appliances, and more particularly to food preparation appliances such as blenders and food processors that operate one or more blades within a container to process food disposed within the container.

BACKGROUND

Food preparation appliances such as blenders and food processors are commonly use to process foods, such as by chopping, crushing, cutting, liquefying, blending, mixing, etc. Such appliances typically have a container in which the food is loaded for processing. The container has one or more blades disposed within the container. When the container is set on a base that houses a drive motor, the drive motor is drivingly connected to the one or more blades in the container. A lid is typically placed on the top of the container to close the container during operation of the appliance.

In some blenders and food processors, the contents in the container tend to rotate about the inner volume of the container during processing. However, the contents are not always evenly mixed. Often times, for example, the contents nearest the blades may be liquefied, whereas contents located further from the blades remain intact (e.g., chunky). In order to improve the performance (i.e., improve the homogeneity of the mixed contents), at least some known containers include a series of ribs extending vertically along all or a portion of the inner sidewall of the container. These ribs may have varying sizes and shapes in cross-section, or contour as taken along the inner circumference of the container, but tend to have a symmetric incline and decline section along the circumferential contour of the inner sidewall of the container. The purpose of the ribs is to create turbulence in the contents of the container as they rotate within the container.

When the contents rotate along the inner circumference of the container sidewall, they strike the ribs and will either travel upward (e.g., vertically) along the inclined side of the rib or travel circumferentially over the rib to its declined side. The contents that travel over the rib may enter a stagnant flow region on the declined side of the rib, and in some instances the contents can remain in the stagnant region for substantially the entire duration of operation of the appliance. As such, the contents in the stagnant zone are not well processed, and the final mixture is not homogeneous. Thus, the ribs may reduce the performance and the uniformity of the final mixture contents of the blender.

The one or more blades of the appliance may also be shaped so as to impart both a rotational force and an axial force to the contents of the container during operation. For example, some blades are upwardly or downwardly angled to force the contents upward/downward as the blades strike the contents (e.g., the food), causing axial flow of the contents within the container. However, performance of the blades can vary with the speed at which the blades are rotated and the contents that are being mixed. In some instances, for example, excessive blade rotation speeds may induce cavitation within the contents being processed, or cause the contents to be forced upward and out of the top of the container. Cavitation within the contents may also cause non-uniformity in the final mixture and thus reduce the efficiency and usefulness of the appliance.

As such, a need exists for a food preparation appliance that provides improved efficiency and uniformity of the processed contents.

BRIEF DESCRIPTION OF THE INVENTION

In one aspect, a food preparation appliance generally comprises a base, a blade member rotatable in a direction of rotation, and a container comprising a closed bottom, an open top and a tubular sidewall extending from the closed bottom to the open top of the container and together with the bottom defining an interior space of the container, with the container having a center. The top of the container is configured for releasable connection with the base, with the blade member disposed within the interior space of the container. The sidewall has a rib projecting inward of the interior space of the container and extending lengthwise along at least a portion of the sidewall from the top of the container toward the bottom of the container. The rib has, in the direction of rotation of the blade member, a peak defined as the shortest transverse dimension measured from the center of the container to the sidewall at a respective height along the portion of the sidewall having the rib, the rib being asymmetric in transverse cross-section.

In one aspect, a container for a food preparation appliance generally comprises a closed bottom and an open top, and a tubular sidewall extending from the closed bottom to the top and together with the bottom defining an interior space of the container. The container is configured to accommodate the blade member within the interior space of the container, with the sidewall having a rim at the open end through which contents to be processed by the appliance are loaded into the interior space of the container, and with the container having a center. The container also has a ramp section extending up from the bottom of the container and extending, in the direction of rotation of the blade member, circumferentially along the sidewall of the container.

In another aspect, a blade assembly for a food preparation appliance of the type having a drive motor for operative connection with the blade assembly to drive rotation of the blade assembly about an axis of rotation of the blade assembly generally comprises a central planar portion extending substantially perpendicular to an axis of rotation of the blade member to lie in a first plane and configured for operative connection with the drive motor. A first wing extends transversely outward from the central planar portion in a first direction and has a distal end and an upturned wingtip at the distal end. A second wing extends transversely outward from the central planar portion in a second direction opposite the first direction, with the second wing having a distal end and an upturned wingtip at the distal end. A third wing extends transversely outward from the central planar portion in a third direction perpendicular to the first and second directions, with the third wing having a distal end and a downturned wingtip at the distal end. A fourth wing extends transversely outward from the central planar portion in a fourth direction opposite the third direction, with the fourth wing having a distal end and a downturned wingtip at the distal end.

BRIEF DESCRIPTION OF THE DRAWINGS

Corresponding reference characters indicate corresponding parts throughout the several views of the drawings.

DETAILED DESCRIPTION OF THE INVENTION

Figure 1:
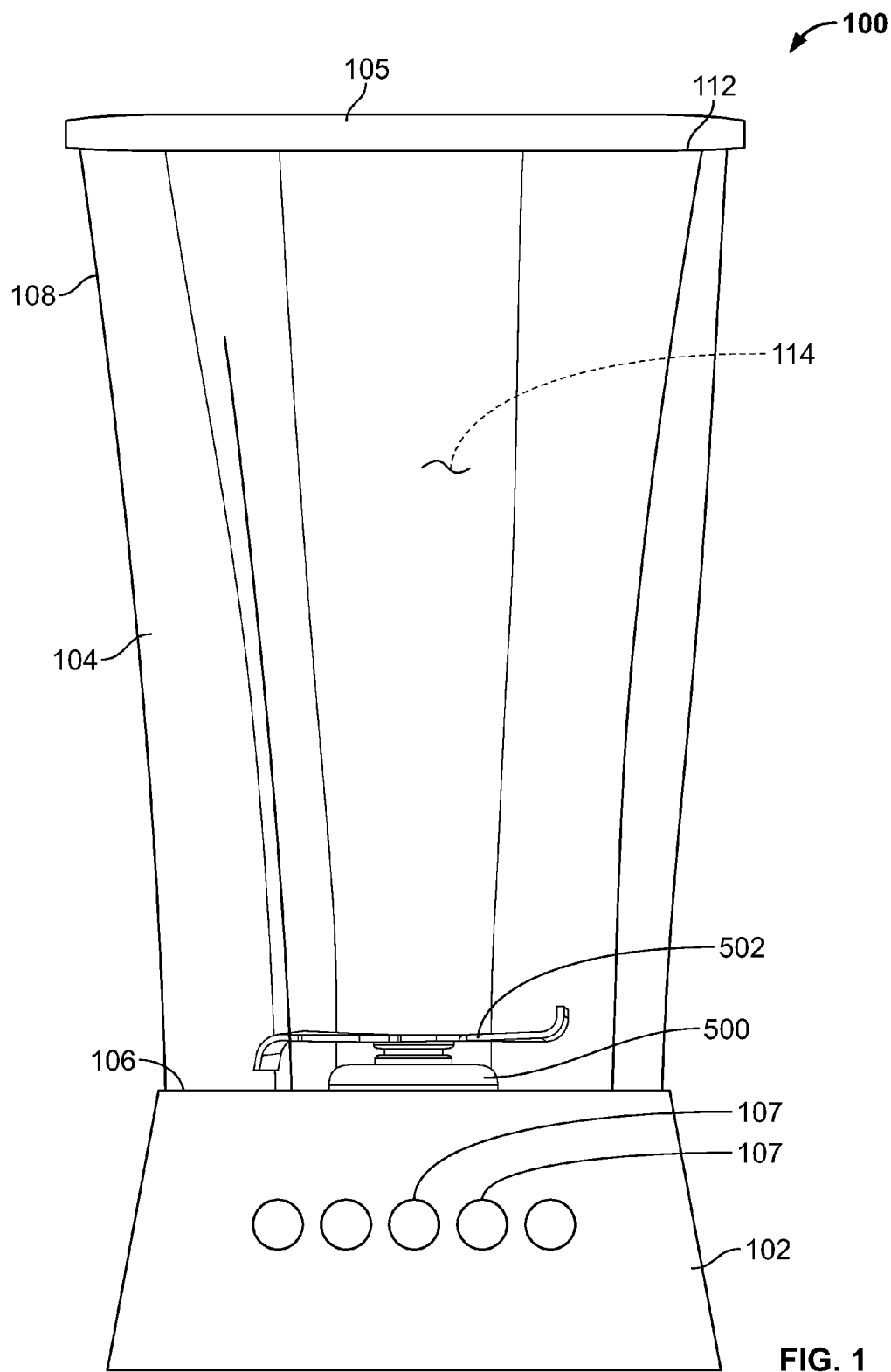
FIG. 1 is a schematic side elevation of one embodiment of a food preparation appliance illustrated in the form of a blender.

Referring now to the drawings, and more particularly to FIG. 1, one embodiment of a food preparation appliance is indicated generally at 100 and is illustrated in the form of a blender. The blender 100 generally includes a base 102 housing a drive motor (not shown) therein, a container 104 releasably positionable on the base and having a blade mount 500 in operative connection with the drive motor and having a blade member 502 thereon, and a lid 105 for closing the container. As used herein, direction and/or orientation terms such as lower, upper, bottom and top refer to the upright orientation of the appliance 100 as illustrated in FIG. 1. The term transverse refers to a direction normal to the height of the container, e.g., horizontal in the illustrated embodiment of FIG. 1. While in the illustrated embodiment the appliance 100 is in the form of a blender, it is understood that the appliance may be in the form of a food processor or other suitable appliance in which a blade member operates within a container to process food or other contents in the container.

Figure 2:
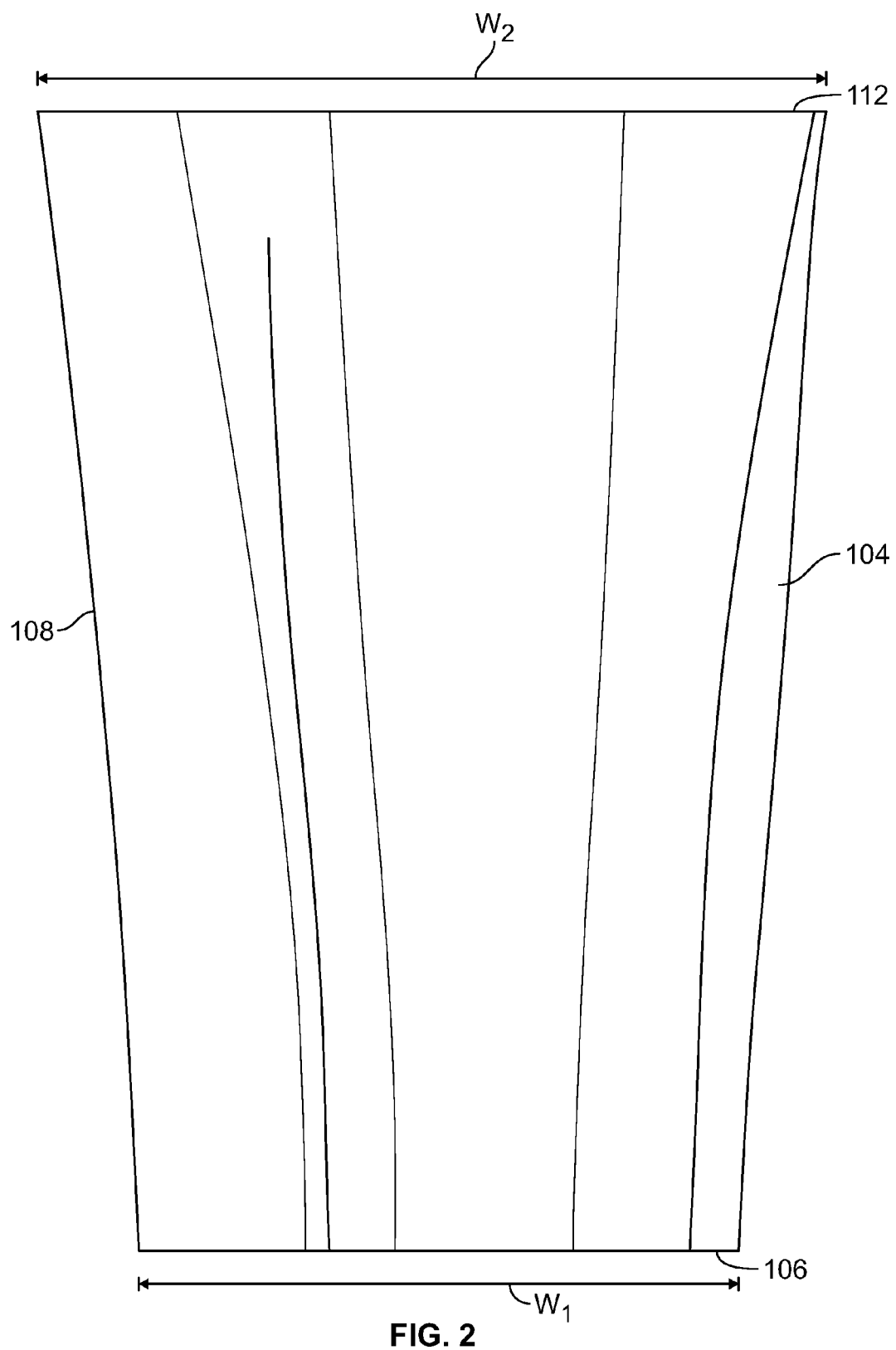
FIG. 2 is a side elevation of one embodiment of a container for use with the blender of FIG. 1, with a handle omitted from the container.
Figure 3:
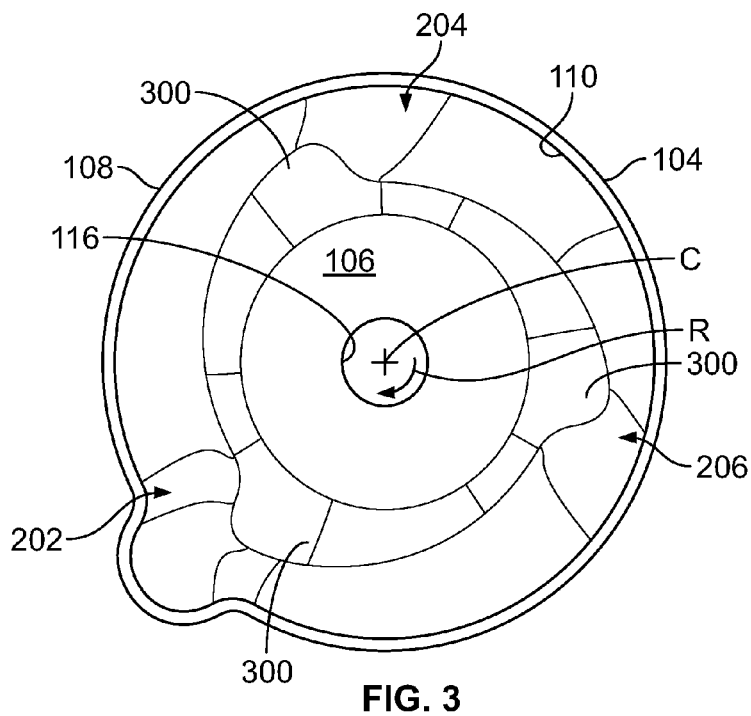
FIG. 3 is a top plan view of the container of FIG. 2.

With reference to FIGS. 1-3, the container 104 has a bottom 106 (FIGS. 2 and 3), and a circumferential sidewall 108 extending up from the bottom 106 of the container so that the bottom and sidewall together define an interior space (broadly, a processing chamber) 114 of the container. The sidewall 108 terminates at an upper rim 112 to define an opening 110 at the top of the container 104 through which food or other contents to be processed are loaded into the interior space 114 of the container. As seen best in FIG. 3, the bottom 106 of the container 104 has a central opening 200 therethrough to permit operative connection between the blade mount 500 and the drive motor disposed in the base 102 of the blender 100 as discussed in further detail later herein. Although the central opening 116 is illustrated as being generally circular, it is understood that the opening may be any suitable shape that allows the blender 100 to function as described herein.

Figure 4:
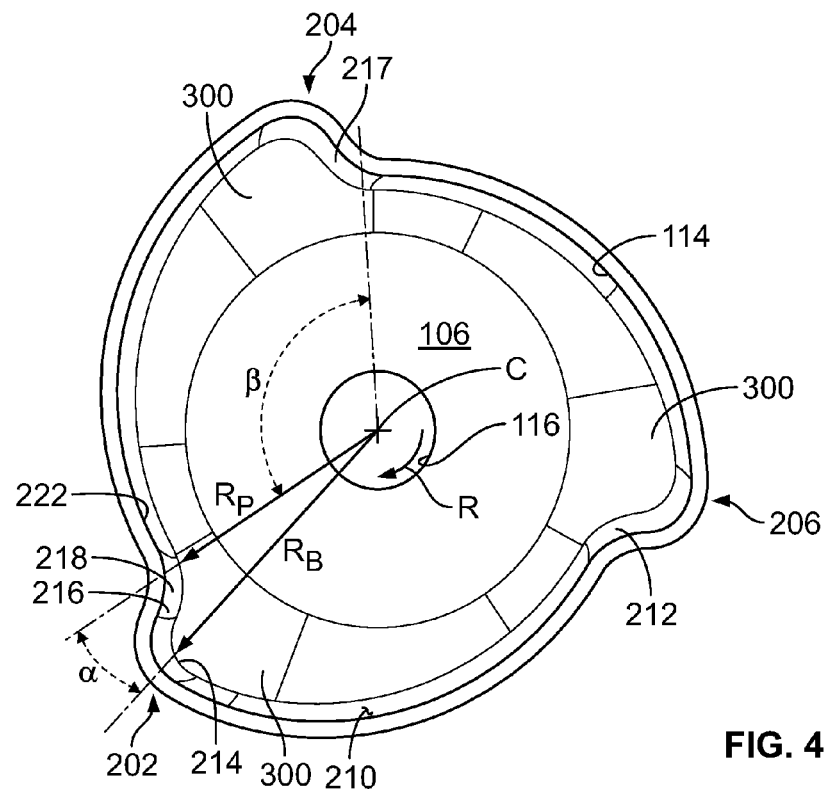
FIG. 4 is a transverse cross-section taken midway along the height of the container of FIG. 3.

In some embodiments, the container 104 may include a handle (not shown) for use in gripping and manipulating the container. The container 104 may also have a spout 118 (FIG. 3) formed generally at its upper rim 112 to facilitate pouring out the contents of the container after processing. In the illustrated embodiment of FIG. 2, the sidewall 108 of the container 104 tapers outward in cross-sectional dimension from the bottom to the top of the sidewall, such that a cross-sectional dimension W2 measured across the container at the rim 112 thereof is greater than a cross-sectional dimension W1 measured across the container where the sidewall transitions to the bottom 106. Such taper may improve blending of the contents therein, and also improves the ease of manufacturing the container 104. As also seen in FIGS. 3 and 4, at the upper rim 112 of the container 104, the container is generally circular (the spout 118 not withstanding), while the cross-section of the container is more triangular as the container sidewall 108 extends down toward the bottom 106 in accordance with the rib configurations described in further detail below. It is understood, however, that the container 104 may be of uniform cross-section along the height of the sidewall 108, or may have a non-uniform cross-sectional dimension other than as illustrated in FIGS. 2 and 3, without departing from the scope of this invention. The container 104 may be constructed of any suitable material including, without limitation, plastic, glass, metal, metal alloys, composites and combinations thereof.

With reference to FIGS. 2 and 3, the blade member 502 is rotatable relative to the container 104 in a rotational direction R as indicated by the direction arrow in FIGS. 3 and 4. In the illustrated embodiment, the container 104 has three rib sections 202, 204 and 206, each extending vertically along a segment of the height of the container sidewall 108 generally from adjacent the bottom 106 of the container to a height less than the full height of the container such that the inner surface, or inner circumference of the sidewall is contoured along a vertical segment of the container. More particularly, with reference to a trace taken along the contoured inner circumference of the sidewall 108 in the direction of rotation R, each rib 202, 204, 206 has a respective peak 218 (for rib 202), 217 (for rib 204) and 212 (for rib 206). With reference to rib 202, each rib includes a respective inflow segment 210 that widens in transverse dimension (e.g., in radius) along the rotational direction R leading into a respective base 214 of the rib 202. The rib peak 218 (e.g., of rib 202) is defined by the point along the rib having the smallest transverse dimension (e.g., radius) measured from a center C of the container 104 to the rib peak 218. The base 214 (e.g., of rib 202) is defined by the point along the rib having the largest transverse dimension measured from the center C to the rib base 214.

The rib 202 further includes a step 216 that decreases in transverse dimension (e.g., in radius) along the direction of rotation R from the rib base 214 to the rib peak 218 of the rib 202. In the illustrated embodiment, the base 214 where the inflow segment 210 transitions to the step segment 216 is generally in the form of a fillet 220 (e.g., rounded) to create a smooth transition therebetween to thereby improve the flow characteristics of the container contents being processed. In other embodiments, however, the base 214 may be configured other than as a fillet, and may even define a straight corner, within the scope of this invention. The rib 202 also has an outflow segment 222 extending away from the peak 218 and along which the transverse dimension (e.g., radius) increases along the direction of rotation R. The outflow segment 222 transitions into the inflow segment 210 of the next rib 204 along the direction of rotation R. In this manner, for each rib (e.g., using rib 202 as an example), the inflow segment 210, step 216, peak 218 and outflow segment 222 together define a generally S-shaped contour, which creates a smooth transition between adjacent ribs 202, 204, 206.

The inflow segment 210 creates a gradual transversely (e.g., radially) outward slope along the direction of rotation R, whereas the step 216 has a relatively steep transversely inward slope to the peak 218 of the rib 202. In some embodiments an angular distance a from the rib base 214 to the rib peak 218 is approximately one-third of an angular distance 13 between circumferentially adjacent rib peaks (e.g., 217, 218). As one example, in the embodiment of FIG. 3 the angular distance 13 between circumferentially adjacent rib peaks 217, 218 is about 120 degrees, such that the angular distance a from the rib base 214 to the rib peak 218 is less than about 40 degrees, and in the illustrated embodiment less than about 30 degrees. Additionally, at any given transverse cross-section of the container 104 along which the ribs 202, 204, 206 extend, a radial distance $R_P$ from the center C of the container 104 to the peak 218 of the rib 202 is between about 60% to about 95% of a radial distance $R_B$ from the center C of the container to the base 214 of the same rib 202.

With reference still to FIGS. 2 and 3, in the illustrated embodiment the container 104 further includes inclined ramp sections 300 (one associated with each rib 202, 204, 206) disposed axially (e.g. heightwise in the illustrated embodiment) between the bottom 106 of the container and the sidewall 108 thereof and circumferentially along the base 214, step 216 and peak 218 of each respective rib (e.g., rib 202). Each ramp section 300 increases in height as it extends circumferentially in the direction of rotation R from the inflow segment 210 to the step 216 of the rib 202. The height of the ramp section 300 also generally increases in height as it extends radially outward from the center of the container. As such, the height of the ramp section 300 is greater adjacent the base 214 and step 216 of the rib 202 than at the outflow segment 222 and inflow segment 210 of the rib.

Figure 5:
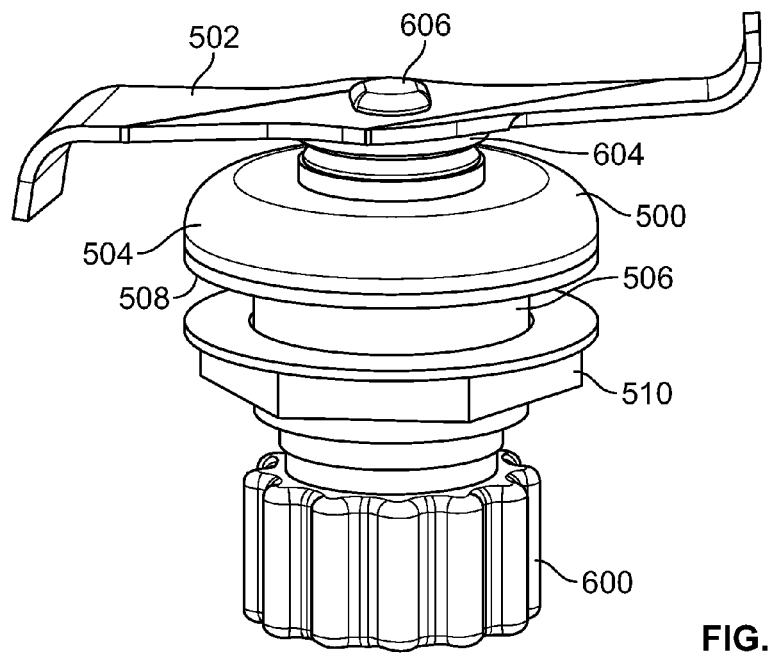
FIG. 5 is a perspective view of one embodiment of a blade mount and blade member for use with the blender of FIG. 1.

With reference now to FIG. 5, the blade mount 500 comprises a hub 504 and an externally threaded cylindrical column 506 depending from the hub such that the column extends down through the central opening 116 of the bottom 106 of the container 104 (see, e.g., FIG. 1) whereby the hub sealingly seats down against the inner surface of the bottom of the container. The illustrated hub includes a sealing gasket 508 to facilitate sealing engagement of the hub against the bottom 106 of the container 104. A nut 510 or other suitable fastener is mounted on the threaded column below the bottom 106 of the container 104 for use in tightly securing the hub 504 on the bottom of the container. A drive shaft 606 extends through the 506 column for operative connection at one (i.e., upper) end to the blade member 502 and at an opposite (i.e., lower) end to a drive coupling 600 that operatively couples with the drive motor (not shown) in the base 102 of the blender 100. The blade mount further includes an annular support plate 604 adjacent the upper end of the drive shaft 606.

Figure 6:
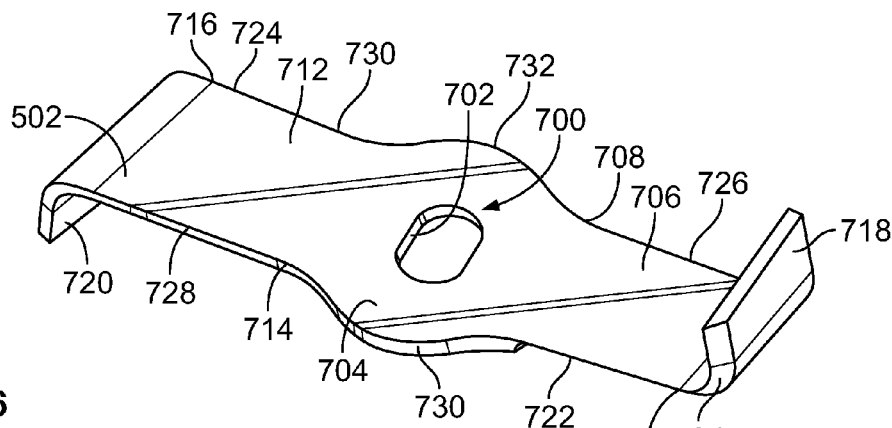
FIG. 6 is a perspective view of the blade member of FIG. 5.

With general reference to FIGS. 6-10, and in particular referring first to FIG. 6, the blade member 502 includes a central hub 700 having an opening 702 therein keyed to the cross-sectional configuration of the upper end of the drive shaft 606 of the blade mount 500 to thereby operatively connect the blade member 502 to the drive motor for driven rotation of the blade member relative to the container 104 upon operation of the drive motor. In some embodiments, the hub 700 and opening 702 of the blade member 502 may be configured relative to the drive shaft 606 such that the blade member 502 may only be installed on the blade mount 500 in a single orientation (i.e., such that the blade member cannot be installed upside down). The blade member 502 may be releasably or permanently connected to the blade mount 500 within the scope of this invention. The blade member 502 may be made of a metal, metal alloy, plastic, ceramic, composite or any other suitable materials and combinations thereof that allow the blade member 502 to function as described herein. In one suitable embodiment, for example, the blade member 502 is constructed of stainless steel.

The blade member 502 has a planar portion 704 (including at least part of the blade member hub 700) extending substantially perpendicular to an axis of rotation $A_R$ (FIG. 8) of the blade member. A first wing 706 extends transversely outward from the planar portion 704 and has a proximal end 708 coupled to the planar portion 704 and a distal end 710 outward of the proximal end. A second wing 712 extends transversely outward from the planar portion 704 on a side of the hub 700 opposite the first wing 706. The second wing 712 has a proximal end 714 coupled to the planar portion 704 and a distal end 716 outward of the proximal end 714 of the second wing 712. An upturned wingtip 718 extends upward from the distal end 710 of the first wing 706 and a downturned wingtip 720 extends downward from the distal end 716 of the second wing 712. The first wingtip 718 and the second wingtip 720, according to one embodiment, are bent at a bend radius of between about 1 millimeter to about 5 millimeters. Each of the first wing 706 and the second wing 712 has a respective leading edge 722, 724 and a respective trailing edge 726, 728. Each of the leading edges 722, 724 may be shaped to have a knife edge (i.e., an angled edge) to facilitate cutting of the contents to be processed in the container 104 when in use. In the illustrated embodiment, the planar portion 704 has opposite blunt, or squared, outer edges 730, 732, although these edges may be partially or wholly sharpened to a knife edge to improve ease of manufacturing the blade member.

Similarly, the first wingtip 718 and the second wingtip 720 may include an angled knife edge 734, 736 to further facilitate cutting or chopping of the contents of the container 104 in use. As seen best in FIGS. 9 and 10, the wingtips 718, 720 are generally rectangular in shape (e.g., in profile as viewed from the longitudinal ends). In other embodiments, however, one or both of the wingtips 718, 720 may be other than rectangular in profile and remain within the scope of this invention. For example, the leading edge 734, 736 of either one or both of the wingtips 718, 720 may be curved, e.g., rounded. The upper edges of the wingtips 718, 720 may also be rounded such that the leading edges 734, 736 and upper edges together form a single continuous knife edge that arcs from the leading edge 722, 724 of the wing 706, 712 to the trailing edge 726, 728.

Figure 7:
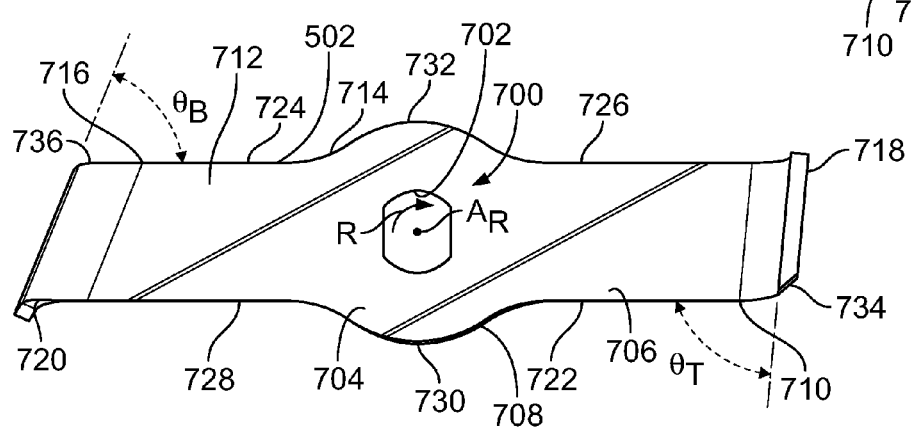
FIG. 7 is a top plan view of the blade member of FIG. 5.
Figure 8:
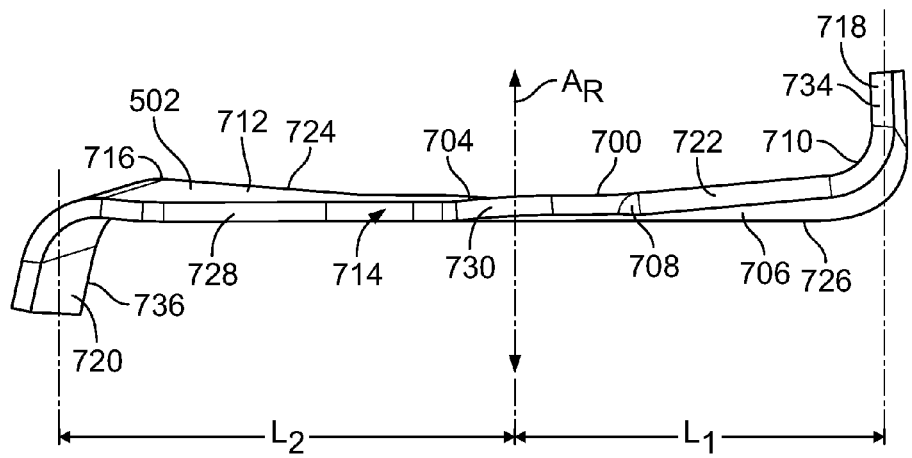
FIG. 8 is a front elevation thereof.
Figure 9:
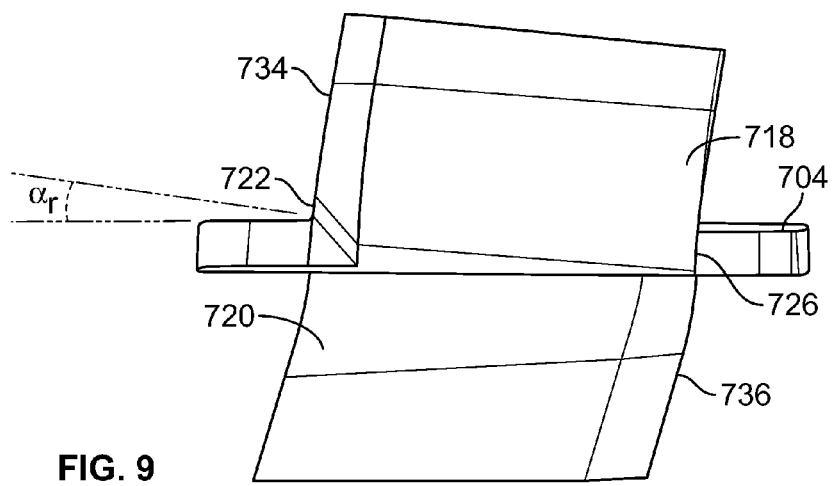
FIGS. 9 and 10 are right and left side elevations, respectively, of the blade member of FIG. 8.
Figure 10:
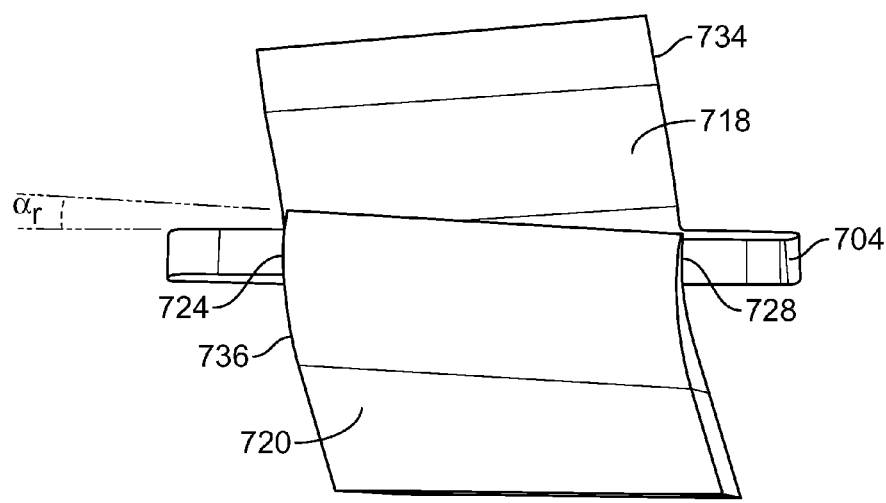

As best illustrated in FIGS. 8-10, the planar portion 704, the first wing 706, and the second wing 712 each extend along a respective different plane such that the blade member 502 has a generally twisted appearance. The planar portion 704 is substantially perpendicular to the axis of rotation $A_R$, which facilitates secure coupling of the blade member 502 to the blade mount 500. More particularly, the planar portion 704 sits flat against the support plate 604 of the blade mount 500. In the illustrated embodiment, the first wing 706 is twisted, such that the leading edge 722 is higher than the trailing edge 726. The second wing 712 is also twisted such that its leading edge 724 is above its trailing edge 728. In one example, each of the first wing 706 and the second wing 712 may be twisted to an angle $\alpha_T$ of between about 0.1 degrees to about 15 degrees with respect to the planar portion 704. As such, when the blade member 502 is rotated in the first direction R (FIG. 7), a propeller action is created, which forces contents in the container 104 that are contacted by the blade member in a downward direction toward the bottom 106 of the container. It should be understood that a lower twist angle reduces strain on the drive mechanism, but reduces the propeller action of the blade member 502, while increased twist angles increase the strain on the drive mechanism but also increase the propeller action of the blade member in use. In other embodiments, one or both of the first and second wings 706, 712 may not be twisted and remain within the scope of this invention.

Each of the first wing 706 and the second wing 712 has a radial length $L_1$, $L_2$ (FIG. 8) respectively measured from the axis of rotation $A_R$ of the blade member 502 to a center of the respective wingtip 718, 720. In the illustrated embodiment, $L_2$ is greater than $L_1$ such that the second wingtip 720 will pass closer to the upstanding sidewall 104 of the container than the first wingtip 718 during operation. However, in other embodiments, $L_1$ may be greater than $L_2$, or $L_1$ and $L_2$ may be equal without departing from the scope of this invention.

Referring to FIGS. 6 and 8, the first wingtip 718 is bent upward from the first wing 706 at an angle that is between 70 degrees and 110 degrees relative to the planar portion 704 of the blade member 502. The second wingtip 720 is bent downward with respect to the second wing 728 at a downward angle less than 90 degrees relative to the planar portion 704. However, the second wingtip 720 may be bent at any angle 90 degrees or less that allows the blade member 502 to function as described herein. In some embodiments, for example, the second wingtip 720 may be bent downward at an angle in the range of approximately 45 degrees to approximately 70 degrees with respect to the planar portion 704 of the blade member 502 to ease in the manufacturing of the blade member, or provide an alternate direction of movement of the contents being processed that is better suited for alternate container 104 geometries. As illustrated best in FIGS. 9 and 10, the wingtip 718 is configured such that the highest point of the leading edge 734 is the highest point of the blade member 502. This ensures that as the blade member 502 rotates, the highest point of the leading edge 734 of the first wingtip 218 comes into contact first with larger objects or chunks (e.g., ice) that are sucked downward in the blender 100 toward the blade member. The leading edge 736 may be higher or lower than the trailing edge of the second wingtip without departing from the scope of this invention.

With reference back to FIG. 7, the first (e.g., upturned) wingtip 718 of the illustrated embodiment is suitably angled relative to the generally straight leading edge 722 of the first wing 706 an angle $\theta_T$ in the range of about 50 degrees to 90 degrees. This further facilitates the leading edge 734 of the upturned first wingtip to come into contact with chunks (e.g., ice) in the middle (heightwise) region of the blender during use, thus minimizing the chances that large chunks will be left in the blender after processing. The second (downturned) wingtip 720 is suitably angled relative to the generally straight leading edge 724 of the second wing 712 an angle $\theta_B$ of less than 90 degrees, and more suitable less than 85 degrees. In this manner, as the blade rotates, the outer face of this wingtip 720 sweeps through the contents of the blender and pushes it radially outward, thus causing the material to get pushed into the sidewall 108 of the container for recirculation and chopping by the first wingtip 718. This also helps circulation of the contents from the region surrounding the blade member 502, up the sidewall 108 and back down the center of the vortex as described further below.

It should be noted that the hub 504 of the blade mount 500 has a height (e.g., above the bottom 106 of the container 104) sufficient that the second wingtip 720 does not make contact with the bottom of the container when in use. In operation, as the blade member 502 is rotated in the first direction R (FIG. 7), the first wingtip 718 may contact and break-apart large chunks of material in the container 104, e.g., before the material is drawn downwardly toward the first wing 706 and the second wing 712 by the propeller action of the blade member 502. The leading edges 722 and 724 then strike the material and further break apart the material. The material is then further propelled downward, where the second wingtip 720 then contacts the material. While in the illustrated embodiment the blade member 502 has two wings 706, 708, it is understood that the blade member 502 may have a single wing, or it may have more than two wings, such as four wings, without departing from the scope of this invention.

Operation of the blender 100 will now be described. The container 104, with the blade member 502 and blade mount 500 assembled therewith, is placed on the blender base 102 as illustrated in FIG. 1. The drive coupling 600 of the blade mount 500 operatively connects to the drive motor (not shown) housed in the base 102 of the blender 100 such that the drive motor imparts a rotation to the drive coupling 600, and thus the blade member 502, upon operation of the drive motor. A user then loads the container 104 (with the lid 105 removed) with one or more materials (e.g., food or other contents to be processed). The lid 105 is then placed on the container 104 to close the interior space 114 of the container so as to inhibit spills or to otherwise inhibit the contents of the container from flowing out of the container during use. The blender 100 is then activated (e.g., by switch 107 illustrated in FIG. 1) to operate the drive motor—thereby rotating the blade member 502 relative to the container 104.

As the blade member 502 rotates, the blade member contacts the contents of the container 100, as discussed above. That is, the first wingtip 718 contacts the material, and the material is subsequently propelled downward and struck by the leading edges 722, 724 before it is again struck by the second wingtip 720. Due to the rotation of the blade member 502, the contents in the container 104 move in a downward direction as well as circularly in the direction of rotation R (FIGS. 3 and 7) of the blade member. As such, a "vortex" may be generated in the contents above the blade member 502. Thereupon, the propeller action of the blade member 502 continues to propel the contents downward toward the bottom 106 of the container 104 as well as radially outward toward the sidewall 108. At least some of the contents flows outward and makes contact with the ramp sections 300 of the container 104, which function to further propel the contents back up toward the top of the container.

As the contents flow in the vortex (e.g., circular) motion within the container 104, the contents being processed flow outward toward the sidewall 108 due to centrifugal force as well as by being pushed outward by the wingtips 718, 720. With reference to FIGS. 2 and 3, the contents being processed thus flow generally circumferentially along the contour of the inner surface of the sidewall 108. In this manner, the contents flow circumferentially along the inflow segment 210 of a particular rib (e.g., rib 202) to the base 214 and then the step 216, wherein the contents are then directed transversely (e.g., radially) inward toward the center C of the container 104. At this point, the contents meet another abrupt change in direction of the rib at the rib peak 218, wherein the rib transitions to the outflow segment at which the transverse dimension begins to gradually increase into the inflow segment of the circumferentially next rib 204.

Without being bound to a particular theory, it is believed that the rapid change in direction caused by the contents flowing from the step 216 to the peak 218 creates turbulence in the vortex flow of the contents, and facilitates the contents moving in an upward direction along the sidewall 108 at or near the rib step 216 and peak 218. The relatively gradual, transversely outward slope of the outflow segment 222 and inflow segment 210 provides a smooth transition from the peak of one rib to the base of the adjacent rib, which inhibits stagnant flow and ensures the material continues moving along the sidewall 108 in the direction of rotation of the blade member 502. Further, the gradual increase in the transverse cross-sectional dimension of the sidewall 108 along its height from the bottom 106 to the upper rim 112 also facilitates the continuous flow of the contents. As the contents being processed flow to a higher level within the container 104, the vortex motion of the contents caused by the propeller action of the blade member 502 again directs the material back downward toward the blade member wherein the flow path of the contents is generally repeated until the blender 100 is turned off.

Figure 11:
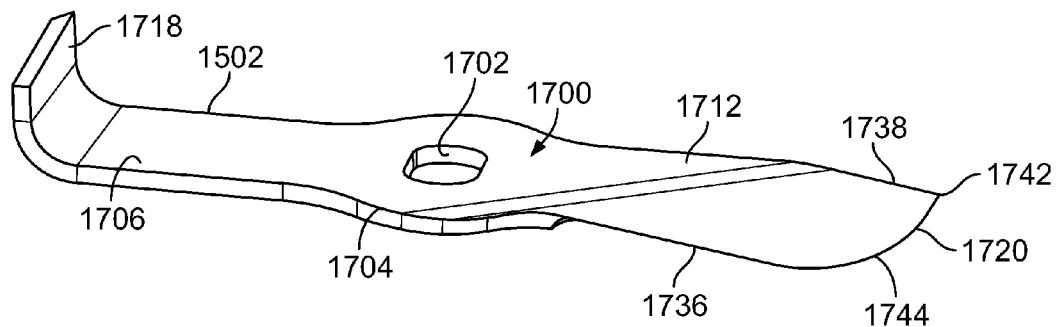
FIG. 11 is a perspective view of one alternative embodiment of a blade member.
Figure 12:
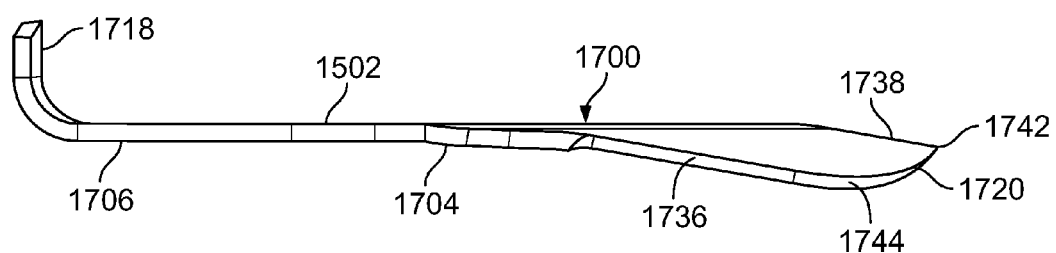
FIG. 12 is a front elevation of the blade member of FIG. 11.

FIGS. 11 and 12 illustrate one embodiment of an alternative blade member 1502 having a hub 1700, opening 1702 and planar portion 1704 similar to the embodiment of FIGS. 6-10. The blade member 1502 has a first wing 1706 and wingtip 1718 similar to the first wing 706 and wingtip 718 of the blade member 502 of FIGS. 6-10, with the exception that the first wing 1706 of this embodiment is not twisted. The blade member 1502 of this embodiment has a second wing 1720 that is also not twisted, and a downturned wingtip 1720. The second wingtip 1720 has a leading edge 1736 with a rounded transition 1744 that continues to a tip 1742 at the trailing edge 1738 of the wingtip. The second wingtip 1720 of this alternate embodiment directs contents contacted by the second wingtip in a radially outward direction, similar to the second wingtip 720 of the blade member 502. However, the second wingtip 1720 of this embodiment directs contents being processed in a more upward direction upon initial contact with the blade member and thus relies less on the configuration of the container 104 to circulate contents upward from the bottom of the container.

Figure 13:
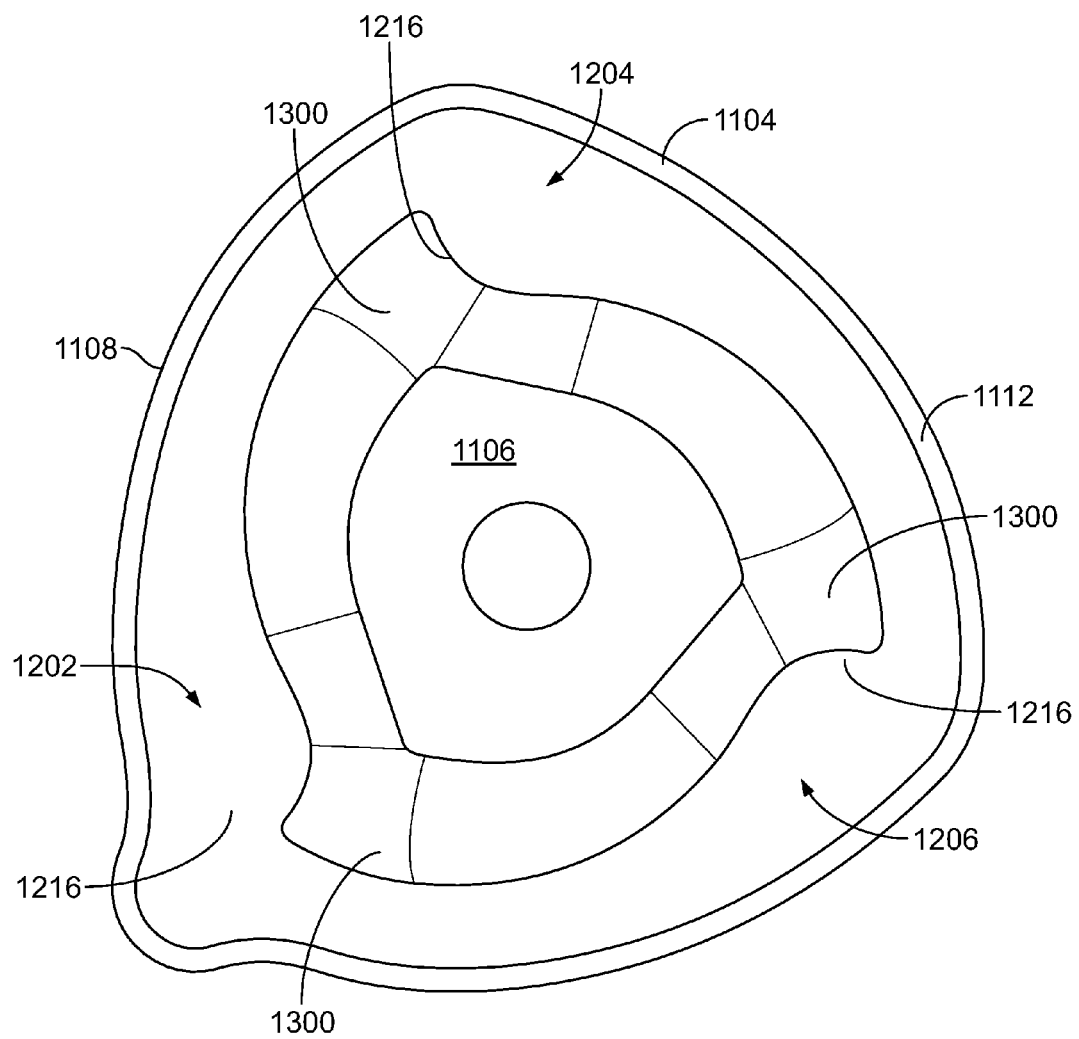
FIG. 13 is a top plan of one alternative embodiment of a container for use with the blender of FIG. 1.
Figure 14:
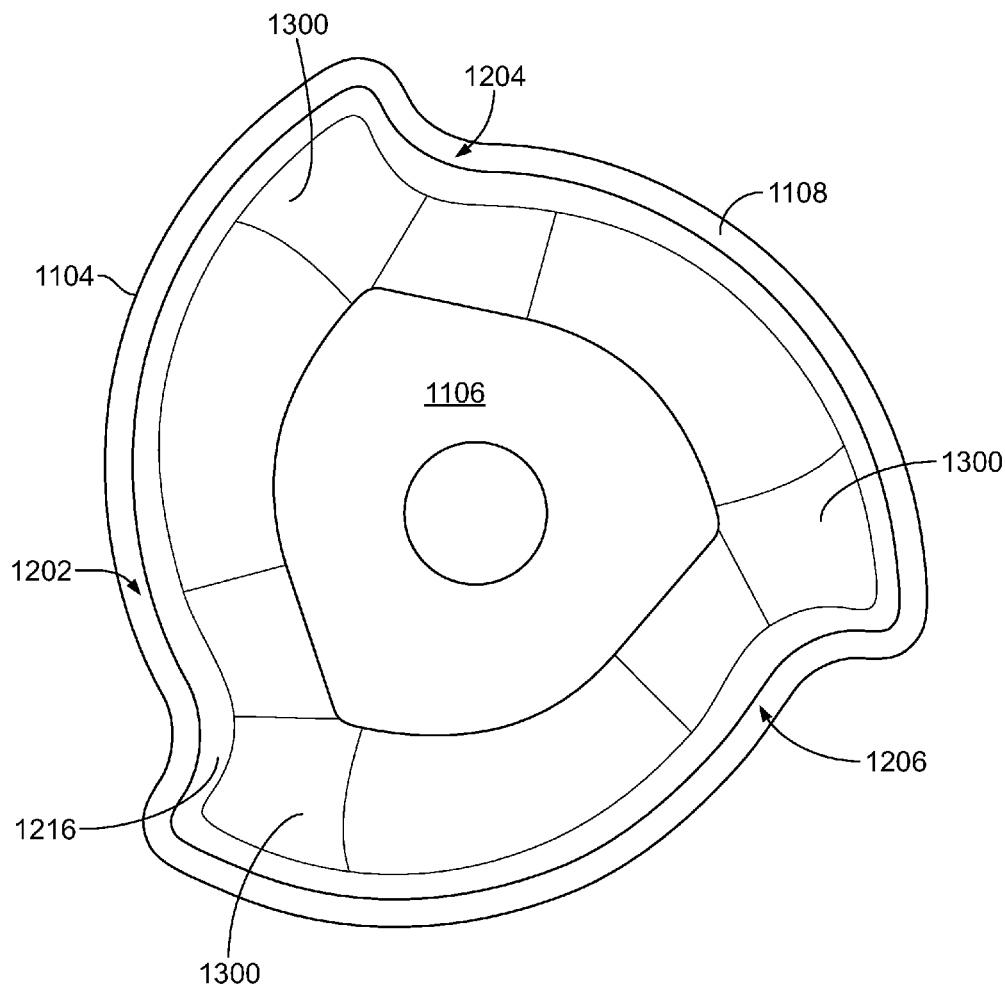
FIG. 14 is a transverse cross-section taken midway along the height of the container of FIG. 13.

FIGS. 13 and 14 illustrate one alternative embodiment of a container 1104 suitable for use with the blender 100 of FIG. 1. The container 1104 has a bottom 1106, upper rim 1112, ribs 1202, 1204, 1206 and ramps 1300 similar to the container 104 of FIGS. 3 and 4. In this embodiment, however, the ribs 1202, 1204, 1206 (with rib 1202 used as an example) include a step 1216 having a substantially steeper slope than the ribs 202, 204, 206 of the container 104 of FIGS. 3 and 4. As seen in FIG. 13, while the ribs generally fade into the sidewall 1108 toward the upper rim of the container 1104, the upper rim 1112 of the container is relatively more triangular than circular as in the previous embodiment.

Figure 15:
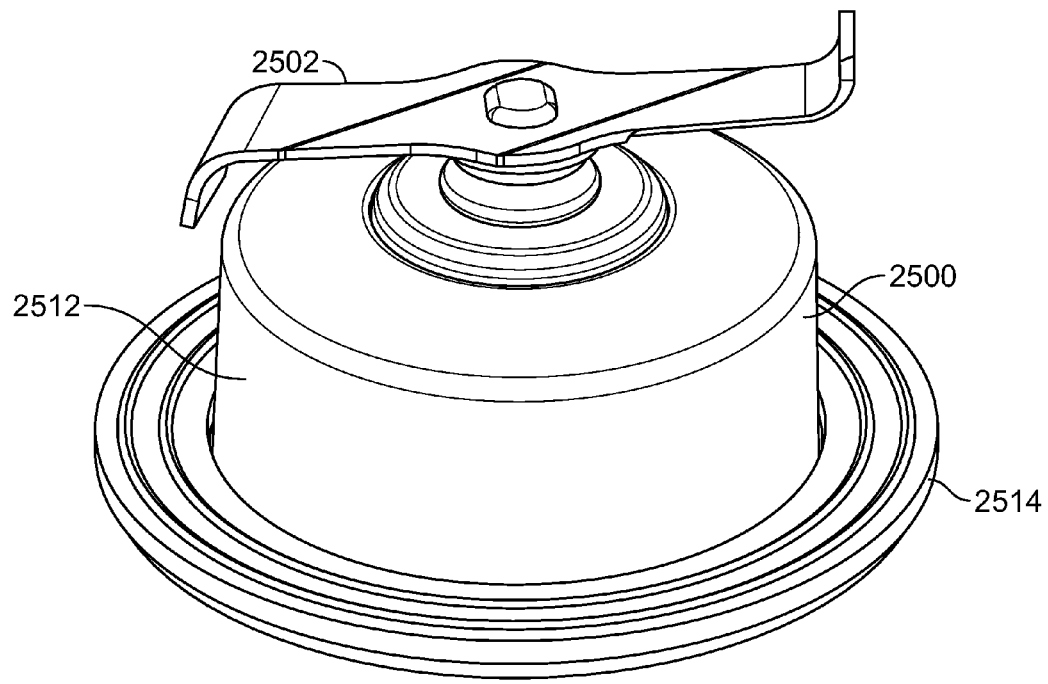
FIG. 15 is a perspective of one alternative embodiment of a blade mount.
Figure 16:
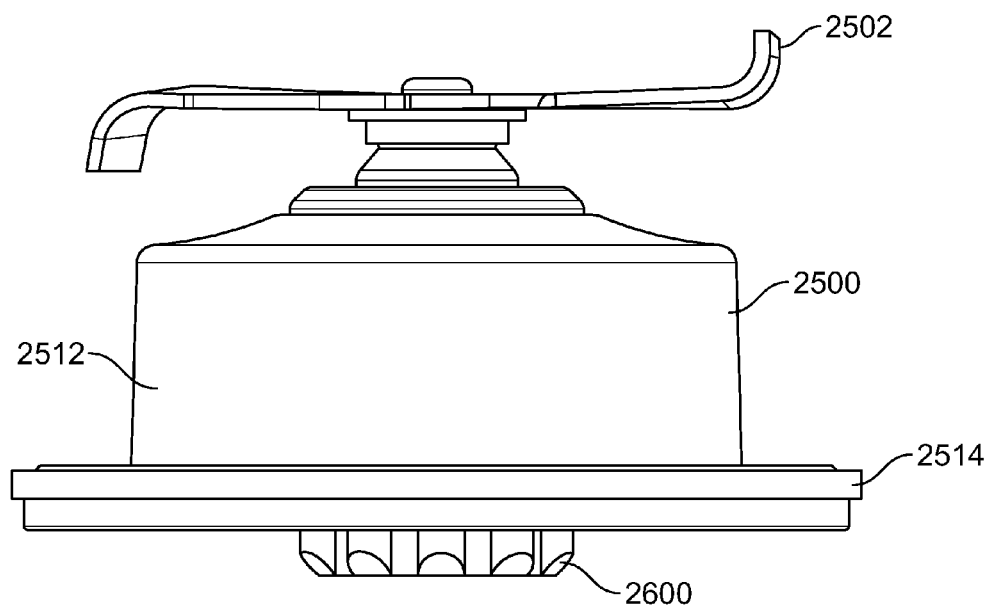
FIG. 16 is a side elevation thereof.
Figure 17:
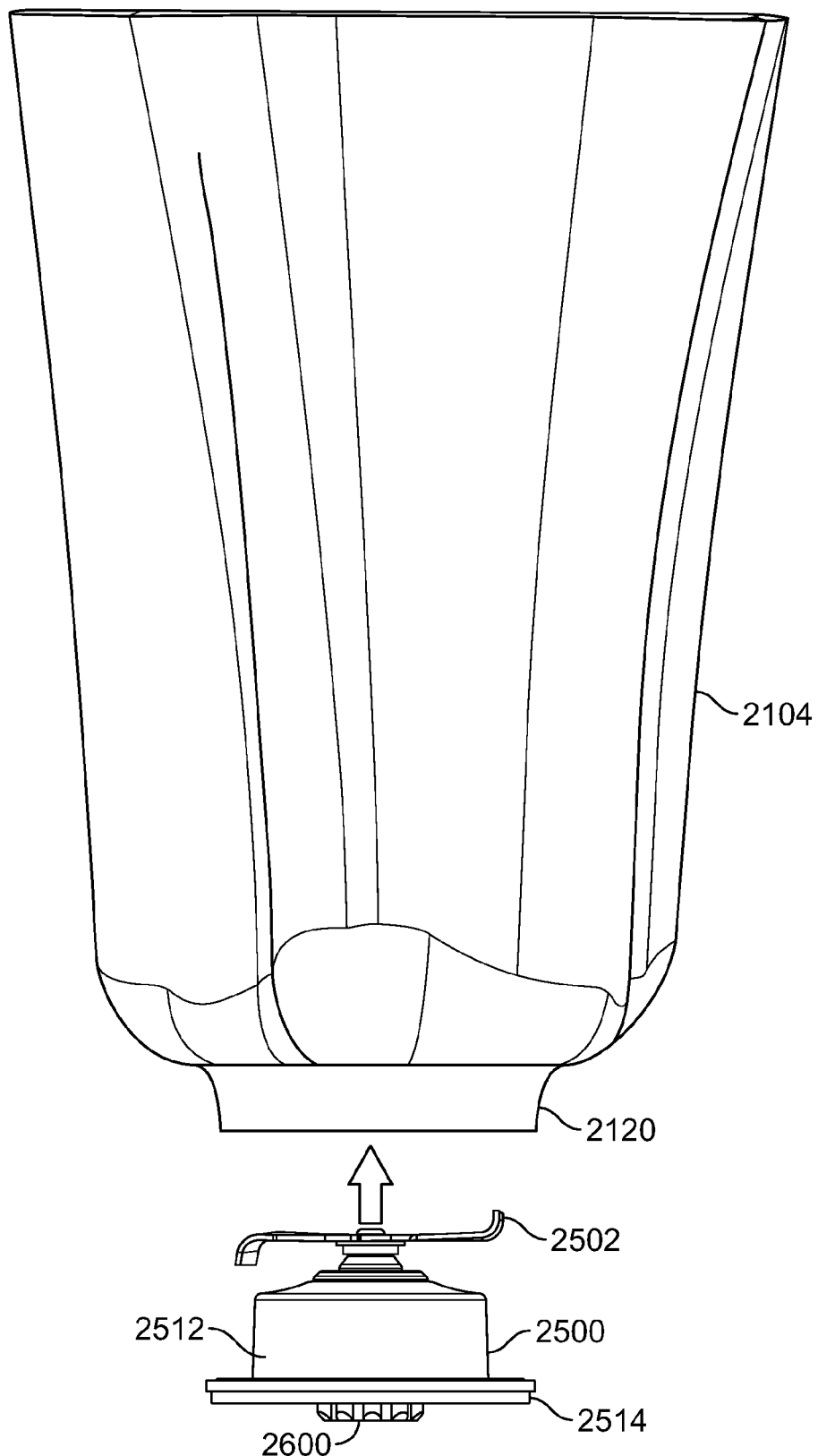
FIG. 17 is a side elevation of an alternative embodiment of a container with which the blade mount of FIGS. 15 and 16 is used.
Figure 18:
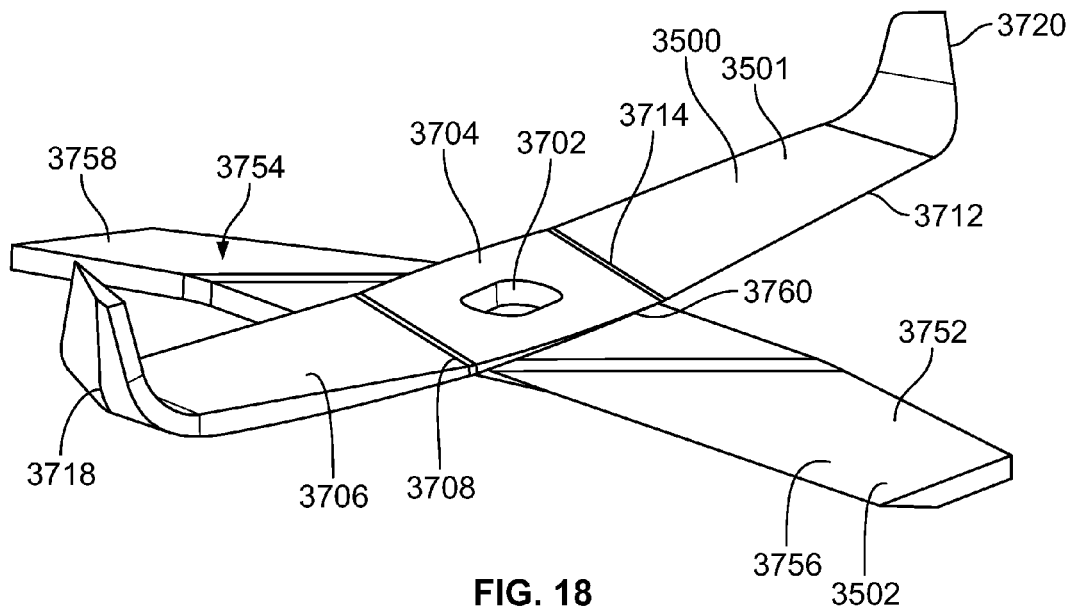
FIG. 18 is a perspective view of a blade assembly suitable for use with the blender of FIG. 1.
Figure 19:
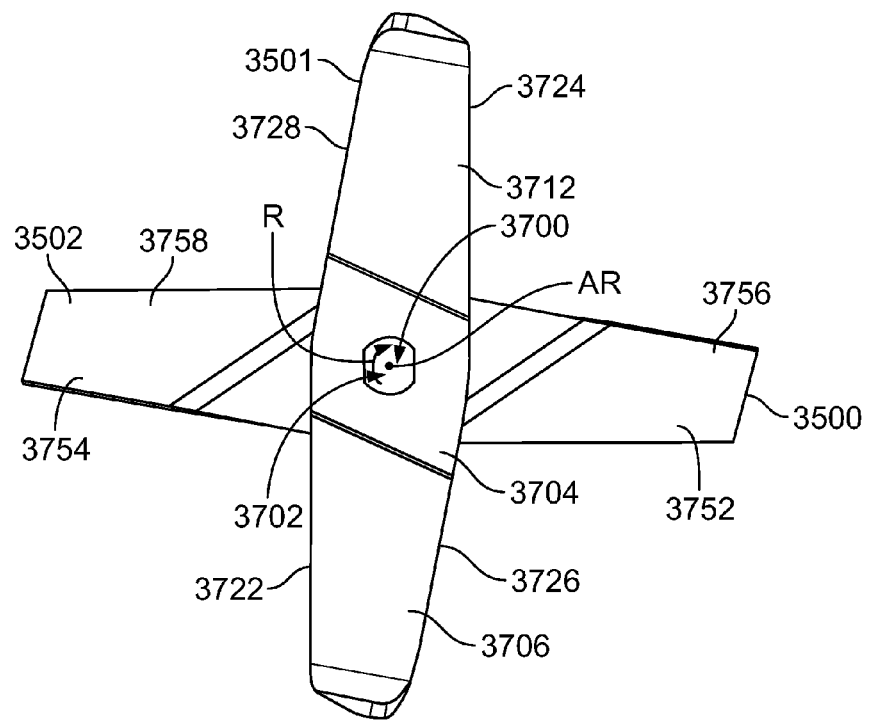
FIG. 19 is a top plan view of the blade assembly of FIG. 18.
Figure 20:
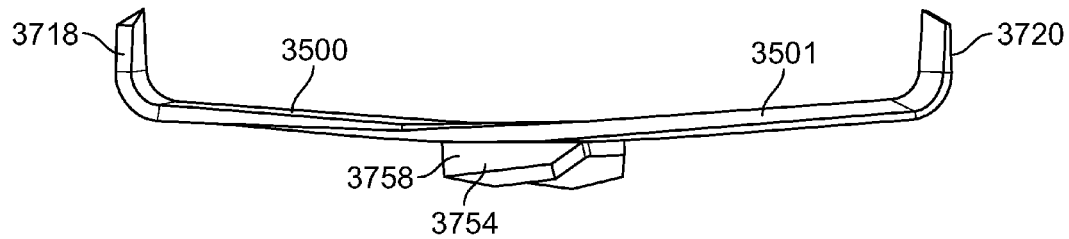
FIG. 20 is a side elevation of the blade assembly of FIG. 18.
Figure 21:
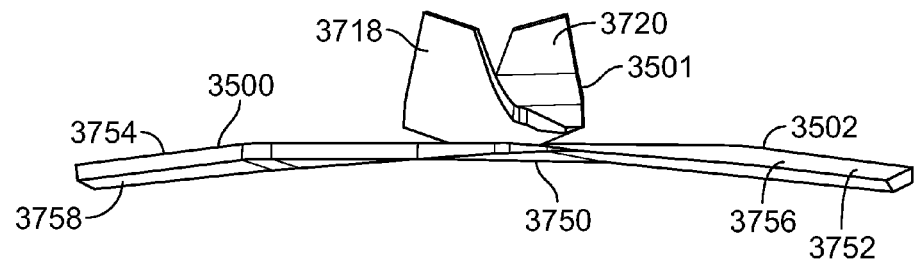
FIG. 21 is a front elevation of the blade assembly of FIG. 18.

FIGS. 15-17 illustrate one alternative embodiment of a blade mount 2500 and container 2104 in which the blade mount is capable of removable assembly with the container by inserting the blade mount and corresponding blade member 2502 thereon up through the opening (not shown) in the bottom of the container. The blade mount 2502 comprises a housing 2512 including an annular flange 2514 extending transversely outward from the housing generally at its lower end for seating against the bottom of the container 2104 (see, e.g., FIG. 17) about the central opening therein. As illustrated best in FIG. 16, a suitable drive coupling 2600 extends axially outward from the bottom of the housing 2512 for operative connection with the drive motor of the blender. The blade member 2502 is operatively connected to the drive coupling 2600 in the same manner as blade member 502 of the embodiment of FIG. 5. The blade member 2502 may be configured similar to any of the blade members 502, 1502 described previously herein.

As illustrated in FIG. 17, the container 2104 has a downward extending collar 2120 defining the opening in the bottom of the container. The container 2104 may otherwise be configured in accordance with any of the containers 104, 1104 described previously herein. The opening at the collar 2120 is sized such that the blade member 2502 and blade mount housing 2512 are insertable upward through the opening until the annular flange 2514 of the blade mount seats up against the bottom of the collar 2120. A suitable sealing gasket (not shown) may be used between the flange 2514 and the bottom of the collar 2120 to provide sealing engagement of the blade mount 2502 to the container 2504. While not shown in the illustrate embodiment, the collar is externally threaded so that a suitable lock nut (not shown) can be used to removably retain the blade mount 2502 on the container 2504.

FIGS. 18-21 illustrate a blade assembly 3500 suitable for use with a food preparation appliance such as the blender 100 of FIG. 1. The blade assembly 3500 comprises a pair of blade members including a first or upper blade member 3501 and a second or lower blade member 3502 arranged in a stacked relationship with the blade members oriented generally perpendicular to each other. It is understood that in other embodiments the blade assembly 3500 may be of a single piece construction with a four blade arrangement similar to the combined blade members 3501, 3502. It is also understood that the blade assembly 3500 may be configured with the blade member 3502 as the upper blade member and the other blade member 3501 as the lower blade member.

The first, or upper blade member 3501 is constructed substantially similar the blade member 502 of FIGS. 6-10 with a central hub 3700, opening 3702 and planar portion 3704. The blade member 3501 further includes a first wing 3706 and upturned wing tip 3718 constructed substantially similar to the first wing 706 and wing tip 718 of the blade member 502 of FIGS. 6-10. In this embodiment, a second wing 3712 with upturned wing tip 3720 is constructed identical to the first wing 3706 and wing tip 3718. The planar portion 3704, the first wing 3706, and the second wing 3712 each extend along a respective different plane such that the blade member 3501 has a generally twisted appearance. The planar portion 3704 is substantially perpendicular to the axis of rotation $A_R$, which facilitates secure coupling of the blade member 3501 and hence the blade assembly 3500 to the blade mount such as the blade mount 500 of the blender 100 of FIG. 1. In the illustrated embodiment, the first wing 3706 is twisted, such that the leading edge 3722 is higher than the trailing edge 3726. The second wing 3712 is also twisted such that its leading edge 3724 is above its trailing edge 3728.

As such, when the blade assembly 3500 is rotated in the direction of rotation thereof (e.g., leading edge 3722, 3724 first), a propeller action is created by the first blade member 3501, which forces contents in the container 104 that are contacted by the blade member in a downward direction toward the bottom 106 of the container. It should be understood that a lower twist angle reduces strain on the drive mechanism, but reduces the propeller action of the blade member 3501, while increased twist angles increase the strain on the drive mechanism but also increase the propeller action of the blade member in use. In other embodiments, one or both of the first and second wings 3706, 3712 may not be twisted and remain within the scope of this invention.

The upturned wingtips 3718, 3720 of the first and second wings 3706, 3712 are suitably angled relative to the generally straight leading edges 3722, 3724 in a manner similar to the upturned wingtip 718 of the blade member 502 of the embodiment of FIG. 7. This further facilitates the leading edges 3734, 3736 of the upturned wingtips 3718, 3720 to come into contact with chunks (e.g., ice) in the middle (heightwise) region of the blender during use, thus minimizing the chances that large chunks will be left in the blender after processing.

The second or lower blade member 3502 also has a planar portion 3750 with a central opening (not shown), with the planar portion being configured to lie flat against the planar portion 3704 of the first or upper blade member 3501 and with the central opening aligned with the central opening 3702 of the upper blade member for operatively mounting the blade assembly 3500 on the drive shaft 606 of the blade mount 500.

This second or lower blade member 3502 further has a first wing 3752 and corresponding downturned wingtip 3756 configured similar to the wing 1712 and downturned wingtip 1720 of the blade member 1502 illustrated in the embodiment of FIGS. 11 and 12. The lower blade member 3502 also has a second wing 3754 and corresponding downturned wingtip 3758 constructed similar to the first wing 3752 and downturned wingtip 3756. The first and second wings 3752, 3754 of this lower blade member 3502 are not twisted. In other embodiments, however, one or both of the wings 3752, 3754 may be twisted without departing from the scope of this invention. The downturned wingtips 3756, 3758 of the lower blade member 3502 direct contents contacted by the wingtips in a radially outward direction as well as generally upward direction upon initial contact with the blade member 3502 to generally direct contents contacted by the lower blade member into the path of the upper blade member 3501. In this embodiment, each of the downturned wingtips 3756, 3758 has a generally rectangular shaped distal end. It is understood, however, that in other embodiments these wingtips 3756, 3758 could have a leading edge with a rounded transition similar to the embodiment of FIGS. 11 and 12.

Figure 22:
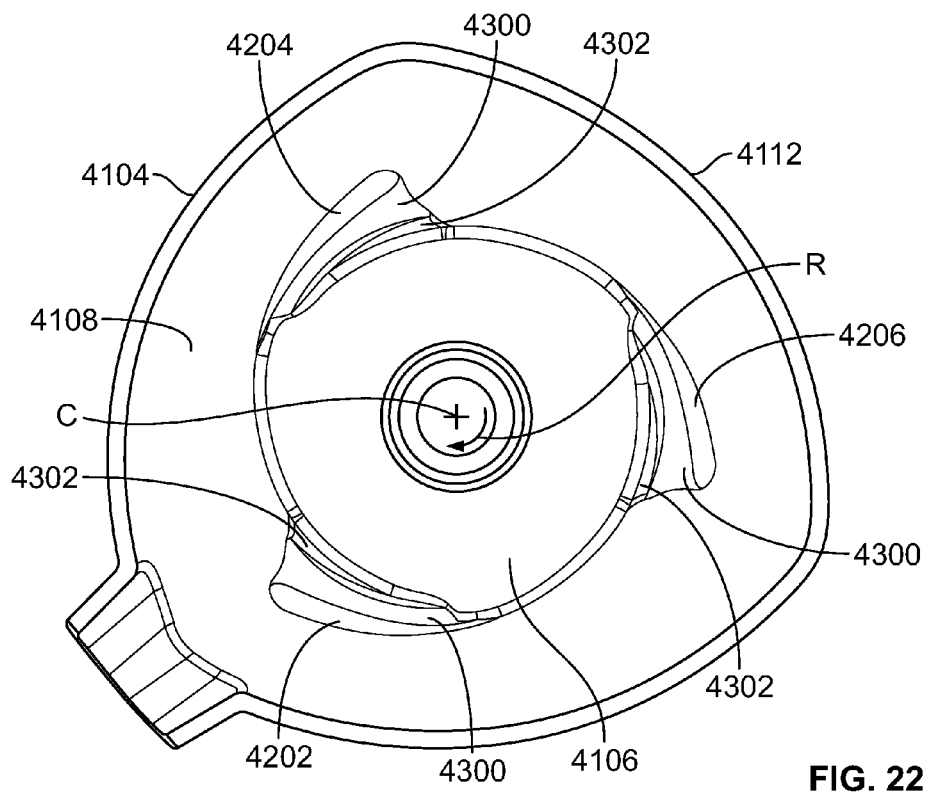
FIG. 22 is a top plan view of another alternative embodiment of a container for use with the blender of FIG. 1.
Figure 23:
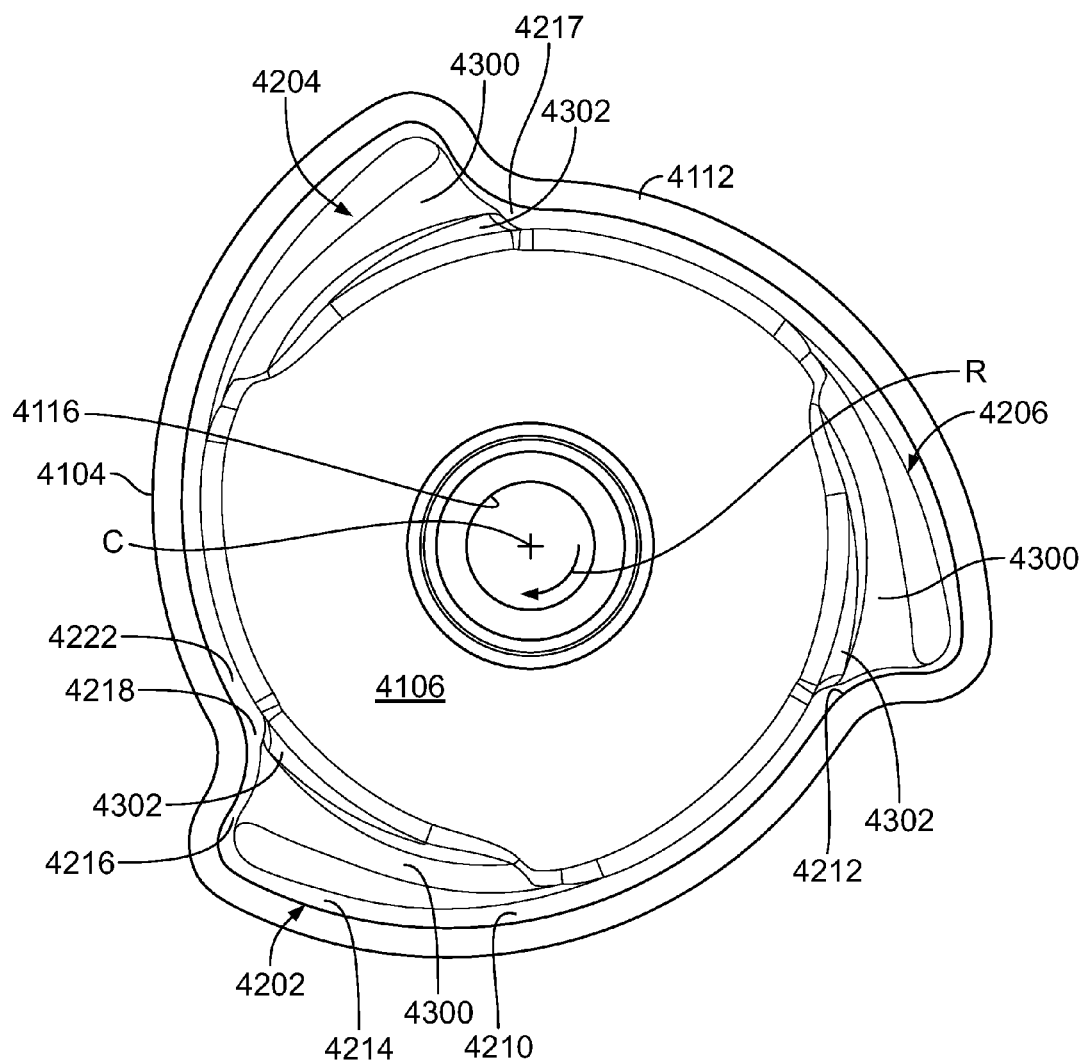
FIG. 23 is a transverse cross-section of the container of FIG. 22 taken along the height of the container of FIG. 22.
Figure 24:
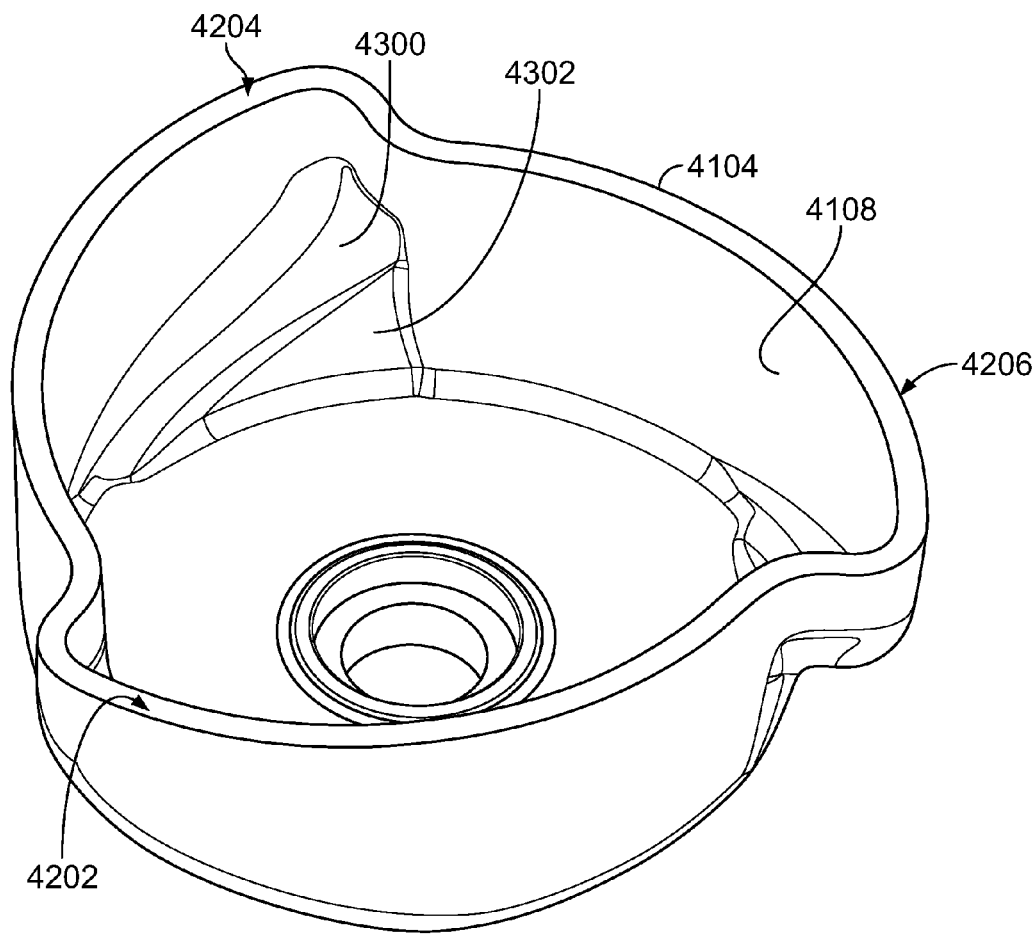
FIG. 24 is a perspective of the transverse cross-section of the container of FIG. 22.

FIGS. 22-24 illustrate another embodiment of a container 4104 suitable for use with (e.g., releasably positionable on the base 102 of) the blender 100 of FIG. 1. The container 4104 has a bottom 4106, circumferential sidewall 4108 extending up from the bottom and terminating at an open upper rim 4112. The bottom 4106 has a central opening 4116 therethrough to permit operative connection between the blade mount 500 (FIG. 1) and the drive motor in the base 102 of the blender 100. The sidewall 4108 of the container 4104 may taper outward in cross-sectional dimension in the same manner as the container 104 of FIGS. 1 and 2, or it may be of generally uniform cross-sectional dimension. The container may be constructed of any suitable material including, without limitation, plastic, glass, metal alloys, composites and combinations thereof.

The container 4104 is generally configured in cross-section similar to the container 104, including having three ribs 4202, 4204, 4206 each extending vertically along a segment of the height of the container sidewall 4108 generally from adjacent the bottom 4106 of the container to a height less than the full height of the container such that the inner surface, or inner circumference of the sidewall is contoured along a vertical segment of the container. More particularly, with reference to a trace taken along the contoured inner circumference of the sidewall 108 in the direction of rotation R of the blade member 502, each rib 4202, 4204, 4206 has a respective peak 4218 (for rib 4202), 4217 (for rib 4204) and 4212 (for rib 4206). With reference to rib 4202, each rib includes a respective inflow segment 4210 that widens in transverse dimension (e.g., in radius) along the rotation direction R leading into a respective base 4214 of the rib 4202 in a manner similar to the container 104 of the embodiment of FIG. 4, a step 4216 similar to the step 216 of the container of FIG. 4, and an outflow segment 4222 similar to the outflow segment 222 of the container of FIG. 4.

With particular reference to FIGS. 23 and 24, in the illustrated embodiment the container 4104 includes an inclined ramp section 4300 (one associated with each rib 4202, 4204, 4206) disposed axially (e.g., heightwise in the illustrated embodiment) between the bottom 4106 of the container and the sidewall 4108 thereof and circumferentially along the base 4214, step 4216 and peak 4218 of each respective rib (e.g., rib 4202). Each ramp section 4300 increases in height as it extends circumferentially in the direction of rotation R along the inflow segment 4210 to the step 4216 of the rib 4202. In contrast to the ramp section 300 of the container 104 of FIG. 4, the ramp section 4300 of the container 4104 of this embodiment defines a generally vertical inner sidewall 4302 extending from the bottom 4106 of the container upward to the surface of the ramp section as the ramp section extends circumferentially along the container sidewall 4108. Such a configuration is intended to inhibit pinching of larger chunks of food between the blade member and the ramp section 4300.

Figure 25:
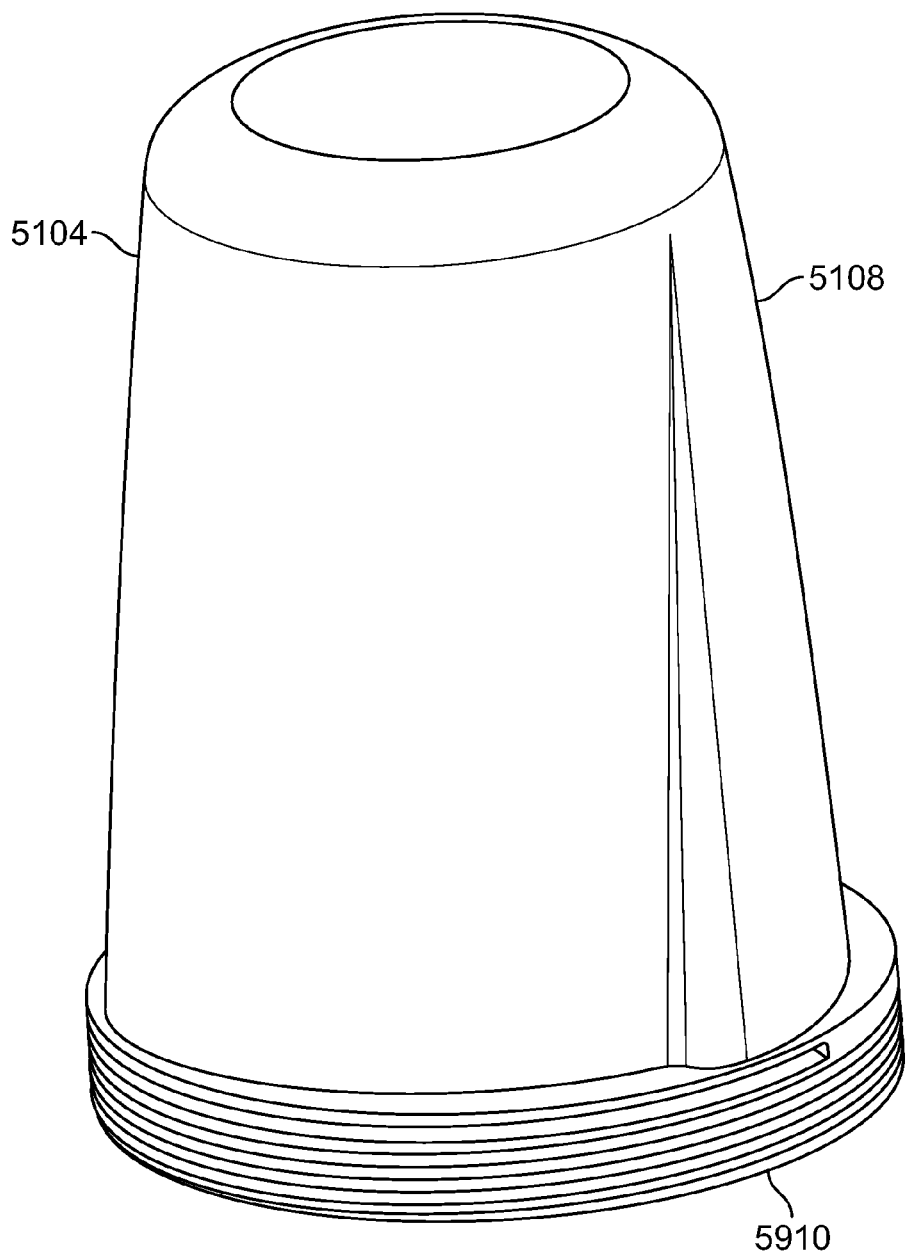
FIG. 25 is one perspective of another an alternative embodiment of a container.
Figure 26:
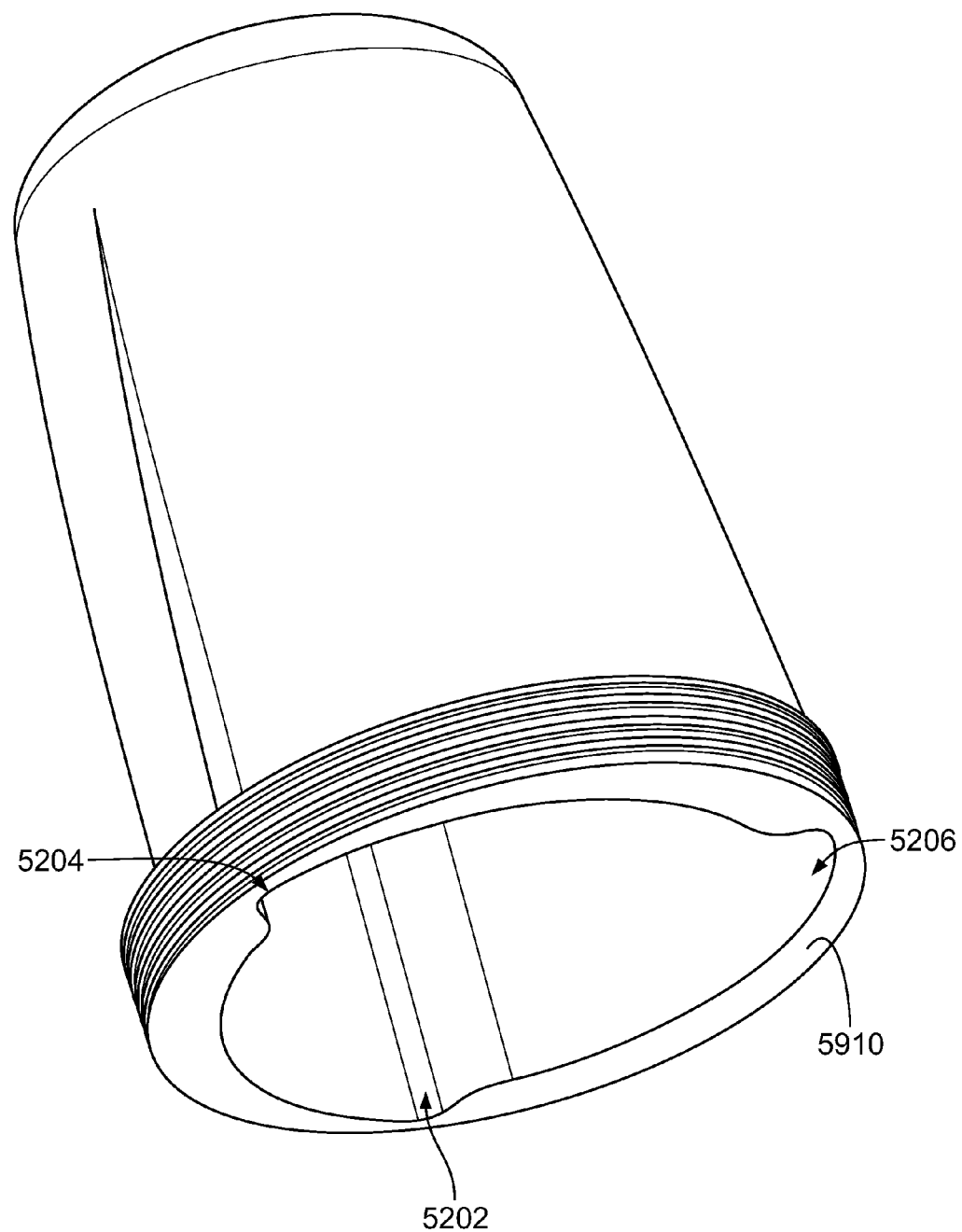
FIG. 26 is another perspective thereof.
Figure 27:
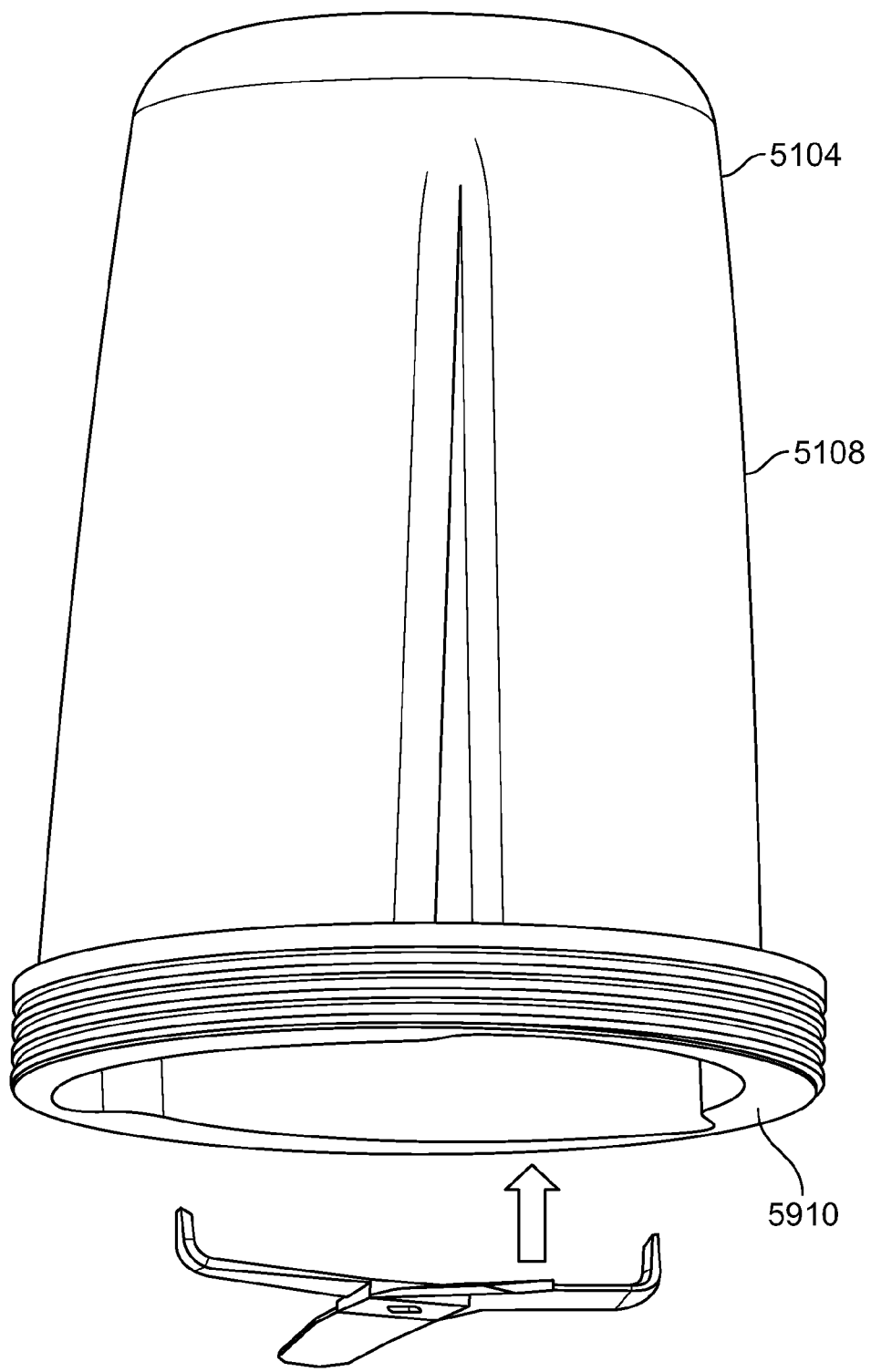
FIG. 27 is a perspective view of the container of FIG. 25 with the blade assembly of FIG. 18.

FIGS. 25-27 illustrate an alternative embodiment of a food preparation appliance in the form of a blender such as a single serve type blender in which a top 5910 of the container 5104 is configured to releasably mount to a base (not shown) with the container in an inverted orientation such as the illustrated orientation. Following a blending operation, the base and container 5104 are oriented with the container upright and the base on top, such that the base can be removed to facilitate access to the blended contents of the blender. FIG. 27 illustrates the container 5104 with one suitable blade assembly 5500 such as the blade assembly 3500 of the embodiment of FIGS. 18-21 or the blade members of the other embodiments described herein.

In this embodiment, the container 5104 includes a circumferential sidewall 5108 extending from the open top 5910 of the container to a closed bottom. The sidewall 5108 is configured in cross-section similar to the sidewall 4108 of the container 4104 of FIGS. 22-24, including the ribs 5202, 5204, 5206. In this embodiment, the container 5104 does not have ramp sections similar to the ramp sections 4300 of the container 4104 of FIGS. 22-24. It is understood, however, that the top 5910 of the container 5104 may be configured to include ramp sections, or the base (not shown) of the blender may be configured to provide suitable ramp sections without departing from the scope of this invention.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description and shown in the accompanying drawings shall be interpreted as illustrative and not in a limiting sense.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A food preparation appliance comprising:
   a base;
   a blade member operatively supported by the base so as to be rotatable in a direction of rotation;
   a container comprising a closed bottom, an open top and a tubular sidewall extending from the closed bottom to the open top of the container and together with the bottom defining an interior space of the container, the container having a center, the top of the container being configured for releasable connection with the base with the blade member disposed within the interior space of the container, the sidewall having a plurality of ribs projecting inward of the interior space of the container and extending lengthwise along at least a portion of the sidewall between the top of the container and the bottom of the container, the ribs each having, in the direction of rotation of the blade member, a peak defined as the shortest transverse dimension measured from the center of the container to the sidewall at a respective height along the portion of the sidewall having the rib,
   wherein each rib comprises, in the direction of rotation of the blade member, an inflow segment leading to the peak and including a first slope and an outflow segment leading away from the peak and including a second slope, the outflow segment of one rib transitioning directly into the inflow segment of an adjacent rib in the direction of rotation of the blade member.

2. The food preparation appliance set forth in claim 1 wherein the container has a transverse cross-sectional dimension that increases along the height of the container from the bottom of the container to the top thereof.

3. The food preparation appliance set forth in claim 1 wherein each rib has, in the direction of rotation of the blade member, a base with the first slope inclining from the base to the peak of the rib, the container having a transverse dimension measured from the center of the container to said base, the transverse dimension of the container measured from the center of the container to said peak being in the range of 60% to 95% of the transverse dimension of the container from the center of the container to said base.

4. The food preparation appliance set forth in claim 1 wherein the second slope of the outflow segment is substantially less than the first slope of the inflow segment.

5. The food preparation appliance set forth in claim 4 wherein the inflow segment has a length, a transverse dimension of the inflow segment increasing along the length of the inflow segment.

6. The food preparation appliance set forth in claim 5 wherein each rib has, in the direction of rotation of the blade member, a base, the first slope inclining from the base to the peak, an angular distance from the base to the peak of each rib being less than or equal to approximately one-third of an angular distance between circumferentially adjacent rib peaks.

* * * * *